United States Patent
Bunch et al.

(10) Patent No.: US 6,793,557 B2
(45) Date of Patent: Sep. 21, 2004

(54) REMOVABLE LAPPING GUIDE FOR MAGNETIC RECORDING HEAD AND METHOD OF USE

(75) Inventors: Richard D. Bunch, San Jose, CA (US); Timothy Clark Reiley, Los Gatos, CA (US)

(73) Assignee: International Business Machines Corporation, Armonk, NY (US)

(*) Notice: Subject to any disclaimer, the term of this patent is extended or adjusted under 35 U.S.C. 154(b) by 288 days.

(21) Appl. No.: 10/155,395

(22) Filed: May 24, 2002

(65) Prior Publication Data

US 2003/0220050 A1 Nov. 27, 2003

(51) Int. Cl.[7] .............................................. B24B 1/00
(52) U.S. Cl. ................................. 451/5; 451/8; 451/28; 451/312; 29/603.15; 29/603.18
(58) Field of Search ......................... 451/5, 28, 8, 312; 29/603.1, 603.09, 603.18, 603.15, 603.12; 360/245.9, 234.3, 323, 317, 67, 236.4; 216/22

(56) References Cited

U.S. PATENT DOCUMENTS

| | | | | |
|---|---|---|---|---|
| 5,588,199 A | * | 12/1996 | Krounbi et al. | 29/603.1 |
| 5,734,531 A | * | 3/1998 | Nix et al. | 360/317 |
| 5,737,152 A | * | 4/1998 | Balakrishnan | 360/245.9 |
| 5,812,344 A | * | 9/1998 | Balakrishnan | 360/245.9 |
| 5,967,878 A | * | 10/1999 | Arcona et al. | 451/5 |
| 6,083,081 A | * | 7/2000 | Fukuroi et al. | 451/5 |
| 6,093,083 A | * | 7/2000 | Lackey | 451/28 |
| 6,193,584 B1 | * | 2/2001 | Rudy et al. | 451/5 |
| 6,195,871 B1 | * | 3/2001 | Watanuki | 29/603.09 |
| 6,286,200 B1 | * | 9/2001 | Huang et al. | 29/603.12 |
| 6,473,258 B1 | * | 10/2002 | Shitara et al. | 360/67 |
| 6,503,132 B2 | * | 1/2003 | Ekstrum et al. | 451/312 |
| 6,553,647 B1 | * | 4/2003 | Itoh et al. | 29/603.06 |
| 6,568,992 B1 | * | 5/2003 | Angelo et al. | 451/8 |
| 6,608,735 B1 | * | 8/2003 | Serpe et al. | 360/236.4 |
| 6,623,330 B2 | * | 9/2003 | Fukuroi | 451/5 |
| 6,663,817 B1 | * | 12/2003 | Chang et al. | 264/400 |
| 6,669,855 B2 | * | 12/2003 | Sasaki et al. | 216/22 |
| 6,678,939 B2 | * | 1/2004 | Yoshida et al. | 29/603.09 |
| 6,710,983 B2 | * | 3/2004 | Voldman | 360/323 |
| 6,728,067 B2 | * | 4/2004 | Crawforth et al. | 360/234.3 |
| 6,729,015 B2 | * | 5/2004 | Matono et al. | 29/603.18 |

* cited by examiner

*Primary Examiner*—George Nguyen
(74) *Attorney, Agent, or Firm*—Lewis D. Nunnelley (57) ABSTRACT

An electrical lapping guide is disclosed which is suitable for use with a single slider having a magnetic recording head. The electrical lapping guide provides for monitoring the progression of lapping; does not require additional electrical connection pads; and, is removable after completion of lapping.

17 Claims, 8 Drawing Sheets

REMOVABLE LAPPING GUIDE FOR MAGNETIC RECORDING HEAD AND METHOD OF USE

BACKGROUND OF THE INVENTION

1. Field of the Invention

The present invention relates in general to magnetic recording heads used, for example, in disk drives; and more particularly the invention relates to a removable lapping guide used during lapping of a magnetic recording head.

2. Description of the Background Art

Disk drives using magnetic recording of digital information store most of the information in contemporary computer systems. A disk drive has at least one rotating disk with discrete concentric tracks of data. Each disk drive also has at least one recording head typically having a separate write element and read element for writing and reading the data on the tracks. The recording head is constructed on a slider and the slider is attached to a suspension. The combination of the recording head, slider, and suspension is called a head gimbal assembly. In addition, there is an actuator which positions the recording head over the specific track of interest. The actuator first rotates to seek the track of interest and after positioning the recording head over the track maintains the recording head in close registration to that track. The disk in a disk drive has a substrate and a magnetic layer on the substrate for magnetic recording. The slider carrying the recording head has a disk facing surface upon which an air bearing is constructed. The air bearing allows the slider to float on a cushion of air and to be positioned close to the disk surface. Alternatively, the slider surface facing the disk can be adapted for partial or continuous contact with the disk.

Recording heads are constructed on a wafer using thin film methods. After the construction of the recording heads, the wafer is typically sliced into rows. Each row will typically have 20 to 80 recording heads. The row is first lapped in order to give the final dimensions to the read and write elements. After lapping, the air bearings are then simultaneously constructed on one surface of the row. Individual sliders are then separated from the row. For very high recording density, row lapping does not deliver the required dimensional control of stripe height of the read element and throat height of the write element.

Improved read element stripe height control is achieved by separating individual sliders from the row prior to lapping and construction of the airbearing. This better control of stripe height is important because each new disk drive product generally has read elements which are smaller than those of previous products. This ever decreasing size of each new read element exacerbates the difficulty of controlling the stripe height during lapping.

Electrical lapping guides have been used to monitor the progress of lapping. Electrical lapping guides are thin films of resistive metal. These stripes of metal are partially removed during the lapping of the slider. Thus by measuring the resistance of the electrical lapping guide during lapping the progress of lapping the read element may be monitored. For example, U.S. Pat. No. 5,588,199 discloses a lapping guide for use with a single slider wherein the lapping guide is connected in parallel with the read element.

What is needed is a lapping guide which is suitable for use with individual sliders, offers an unambiguous indication of lapping progression, does not interfere with the read or write elements, and is capable of being removed or inactivated after the lapping has been completed.

SUMMARY OF THE INVENTION

The present invention provides an electrical lapping guide for use with individual sliders. The electrical lapping guide thus provided allows lapping to be monitored without the need for additional connection pads and without causing interference with the read or write elements.

In a preferred embodiment, the electrical lapping guide is a resistive thin film member having a relatively high resistance. One of the electrical leads forming a connection to the electrical lapping guide is connected to one of the read element connection pads. The other electrical lead forming a connection to the electrical lapping guide is connected to one of the write element connection pads. By these electrical connections, the resistance monitored during lapping unambiguously indicates the state of the electrical lapping guide.

One of the electrical connections to the electrical lapping guide can be shallow with respect to a surface of the slider and therefore removable by ion milling or reactive ion etching after lapping is complete. Removing the electrical circuit of the electrical lapping guide can eliminate interference with subsequent use of the read or write elements in the recording head.

Other aspects and advantages of the invention will become apparent from the following detailed description, which when taken in conjunction with the drawings, illustrate by way of example the principles of the invention.

DETAILED DESCRIPTION OF THE INVENTION

As shown in the drawings and described in detail below, the invention is embodied in an electrical lapping guide for individual sliders. The resistance of the electrical lapping guide may be monitored during lapping, providing an unambiguous indication of lapping progression. After lapping is complete, a connection to the electrical lapping guide may be removed thus causing the electrical lapping guide to become electrically inactive.

Figure 1:
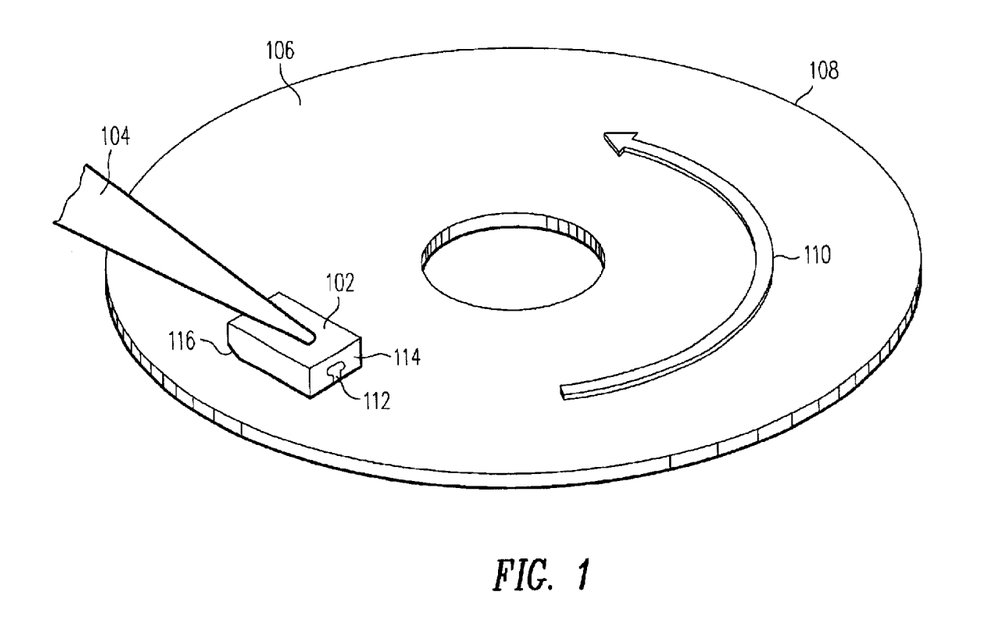
FIG. 1 illustrates a recording head and disk used in magnetic recording.

FIG. 1 shows a slider 102 as attached to a suspension 104 and flying above the surface 106 of the disk 108. When operating, the disk 108 spins in a direction indicated by arrow 110. The slider 102 typically has a disk facing side (not shown) upon which the air bearing is constructed. This side of the slider is sometimes referred to as the air bearing surface although the air bearing surface itself usually includes a plurality of recesses formed disk facing side of the slider 102 to control aerodynamic pressure forces between the slider 102 and the disk surface 106. The recording head 112 is normally constructed on the trailing surface 114 of the slider 102. The leading edge of the air 105 bearing surface has an optional tapered portion 116, which helps in forming a uniform air bearing.

Figure 2A:
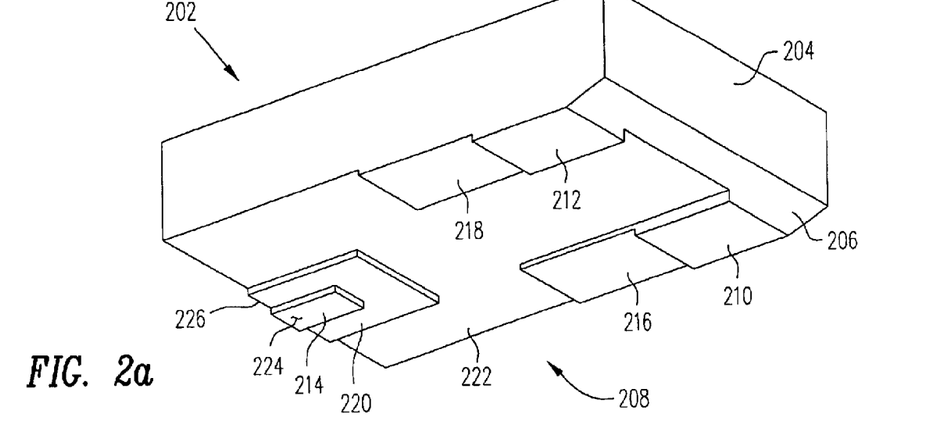
FIG. 2a illustrates a perspective view of a slider.

FIG. 2a shows a perspective drawing of a typical slider 202. FIG. 2a shows the front surface 204 of the slider 202, the optional tapered region 206, and the air bearing 208. The optional tapered region 206 in FIG. 2a is illustrated as reference 116 in FIG. 1. There are many air bearing designs differing somewhat in geometrical features. The common aspect of air bearing designs is that most are comprised of two or more surfaces which are recessed or offset from one another. In the example shown in FIG. 2a there are three such surfaces. The first surface is shown as segments 210, 212, and 214. These segments are not contiguous but lie in approximately the same plane and therefore are referred to as a single surface. The next surface is indicated by segments 216, 218, and 220. These segments are also not contiguous but lie in approximately the same plane. The plane defined by segments 216, 218, and 220 is recessed compared with the plane defined by segments 210, 212, and 214. The recessed or offset distance varies according to the design requirements of the air bearing and is typically from about 0.1 to 0.5 $\mu$m. The third surface 222 in FIG. 2a is typically less than 4.0 $\mu$m recessed or offset from the plane defined by segments 210, 212, and 214. The location of the recording head 224 is near the trailing edge 226 of the air bearing 208. Recessed surfaces are typically formed by ion milling or reactive ion etching through openings in appropriate masks.

Figure 2B:
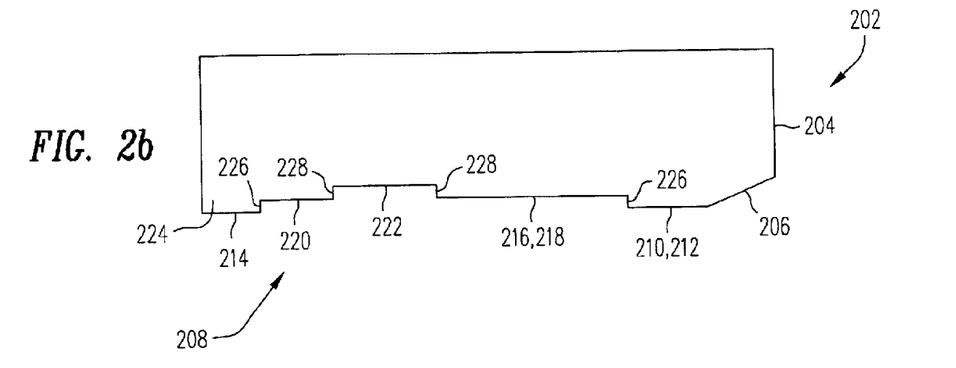
FIG. 2b illustrates a side view of a slider.

FIG. 2b illustrates a side view of the slider 202. The front surface 204 and the optional tapered region 206 are viewed in profile. The recessed distance 226 of the plane defined by segments 210, 212, 214 and the plane defined by segments 216, 218, and 220 is illustrated. Also the recessed distance 228 of the plane defined by segments 216, 218, 220 and the plane shown by reference number 222 is illustrated.

Figure 2C:
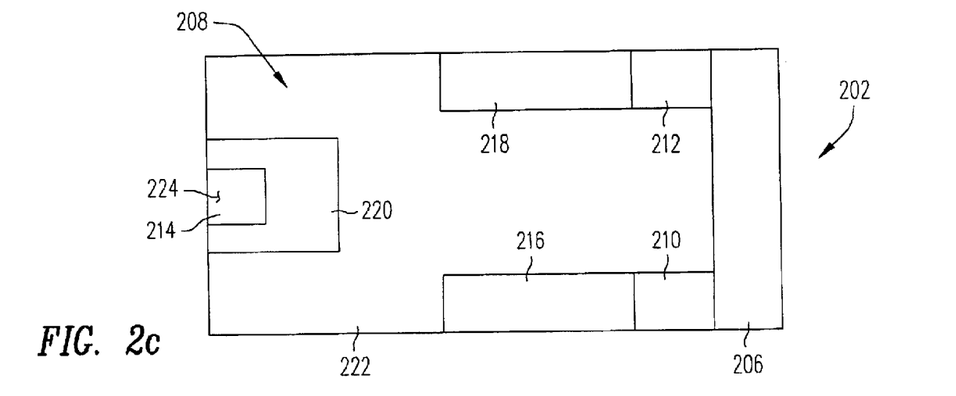
FIG. 2c illustrates a bottom view of a slider.

FIG. 2c illustrates a view of the air bearing 208 side of the slider 202. The optional tapered region 206 is illustrated. The surface defined by segments 210, 212, and 214 is illustrated. The surface defined by segments 216, 218 and 220 is illustrated. And finally, the surface 222 is illustrated.

Figure 3:
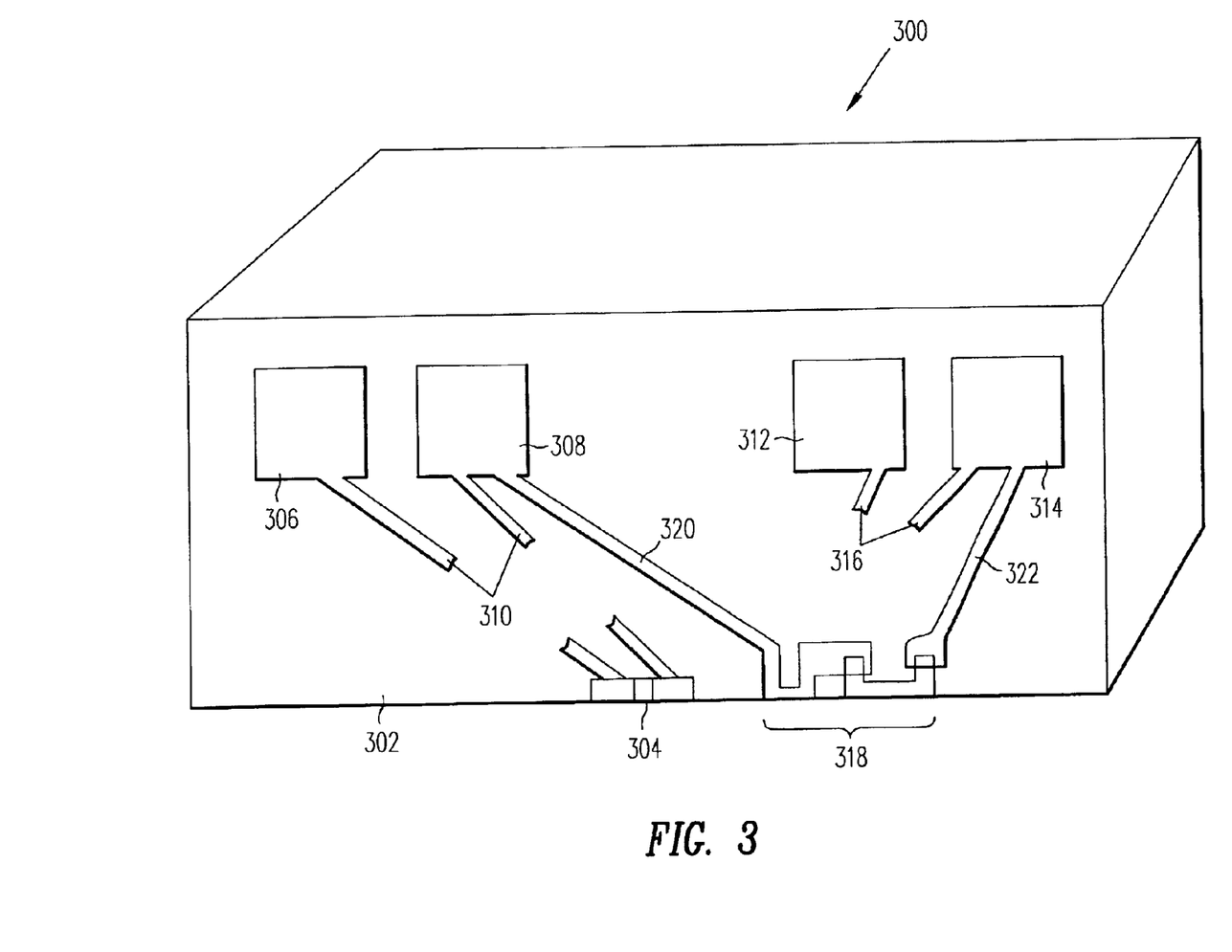
FIG. 3 illustrates the trailing surface of a slider having an electrical lapping guide.

FIG. 3 illustrates one embodiment of the invention. FIG. 3 shows the trailing surface 302 of a typical slider 300. Constructed on the trailing surface 302 is a read element 304, two connection pads 306, 308 connected by metallic conductors 310 to the read element 304, a write element (not shown), two connection pads 312, 314 connected by metallic conductors 316 to the write element (not shown), and an electrical lapping guide 318. The electrical lapping guide 318 is a resistive thin film member with two conductive leads 320, 322. One lead 320 connects the electrical lapping guide 318 to one of the read element connection pads 308. The other conductive lead 322 connects the electrical lapping guide 318 to one of the write element connection pads 314. For visual clarity in FIG. 3, the conductors 310, 316 for the read element 304 and write element (not shown) are not shown in complete detail. Although one specific example of an electrical lapping guide is illustrated in FIG. 3, the invention is not limited by that specific example. Other specific arrangements are possible without departing from the scope of the invention. For example the electrical lapping guide can be on the left side of the trailing surface of the slider and the connection pads may have a different order. Alternately, additional dedicated connection pads may used, however there is limited space on the trailing surface of the slider for additional pads.

Referring again to FIG. 3 the resistance of the electrical lapping guide 318 is measured between the connection pads 308, 314 during lapping. Since neither the read element 304 nor the write element (not shown) is in parallel connection with these two pads 308, 314 during lapping, the measured resistance is an unambiguous indication of the state of the electrical lapping guide 318.

Figure 4A:
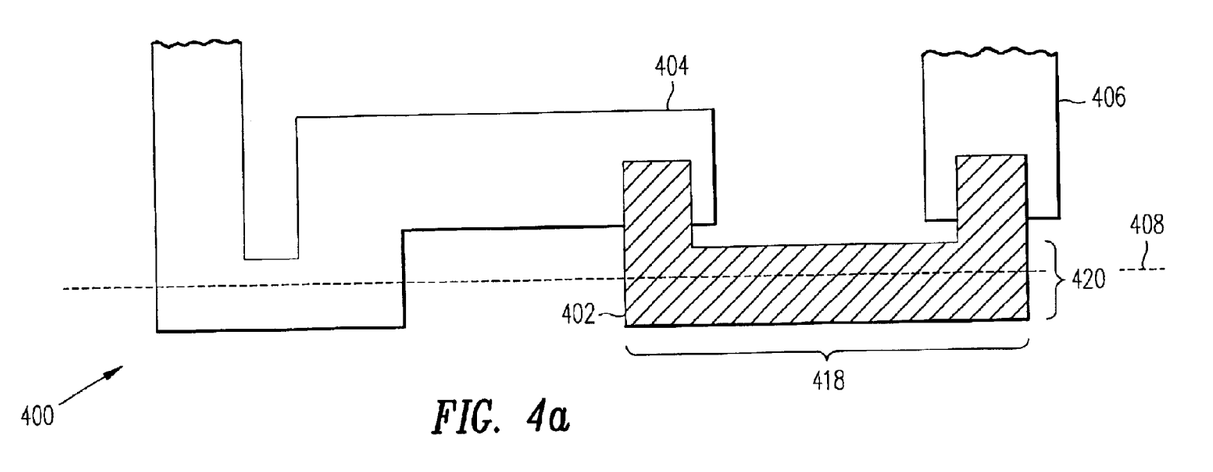
FIG. 4a illustrates an embodiment of an electrical lapping guide before lapping.
Figure 4B:
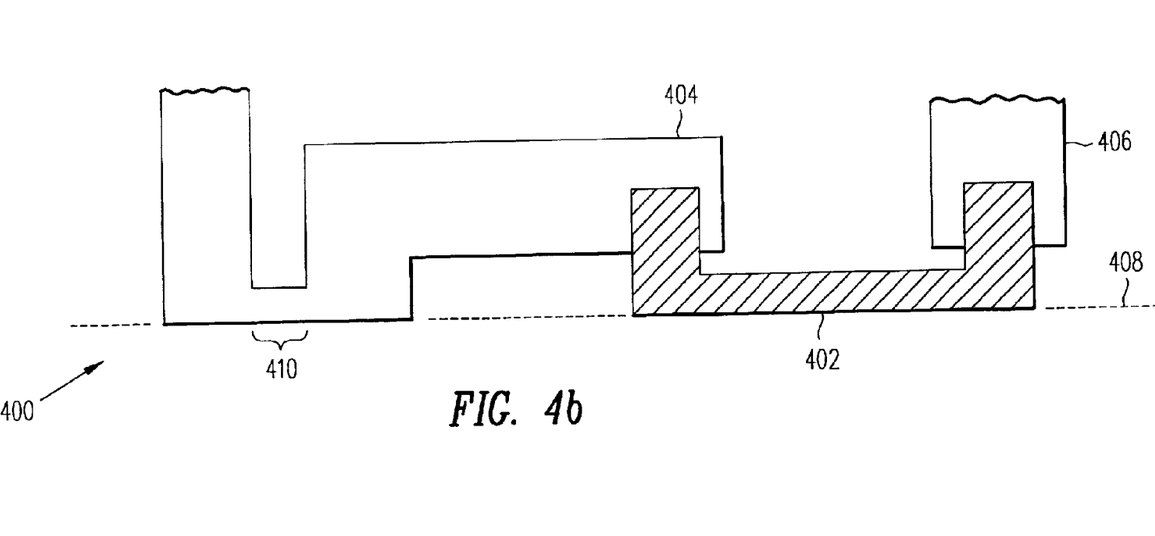
FIG. 4b illustrates an embodiment of the electrical lapping guide after lapping.

FIGS. 4a, b, c, and d illustrate the electrical lapping guide 400 in more detail. FIG. 4a illustrates a resistive thin film member 402 having two ends and electrical leads 404, 406 attached to the ends of the resistive thin film member 402. The resistive thin film member 402 is conveniently formed along with the read element (304 in FIG. 3) and of the same materials as the read element. Forming the resistive thin film member 402 along with the read element greatly simplifies the task of aligning the resistive thin film member 402 with the read element. Proper alignment is necessary for the resistance of the electrical lapping guide to indicate the lapped state of the read element. If alignment is not adequate the resistance of the resistive thin film member 402 during lapping may not be an adequate indication of the stripe height of the read element. Alternatively the resistive thin film member 402 may be formed of other resistive materials using different process steps. If different process steps are used to make the read element and the electrical lapping guide, the task of achieving good alignment may be more difficult. The electrical leads to the resistive thin film member 402 are conveniently formed of tantalum, tungsten, titanium, alloys of nickel-iron, or other suitable materials. Preferably, the resistivity and thickness of the electrical leads 404, 406 are chosen such that the resistance of the electrical leads 404, 406 is substantially less than the resistance of the resistive thin film member 402. During lapping, a portion of at least one of the leads 404 and the resistive thin film member 402 will be removed. The dashed line 408 in FIG. 4a indicates an example of the extent of final lapping. FIG. 4b illustrates the electrical lapping guide 400 after lapping to the location indicated by the dashed line 408.

Figure 4C:
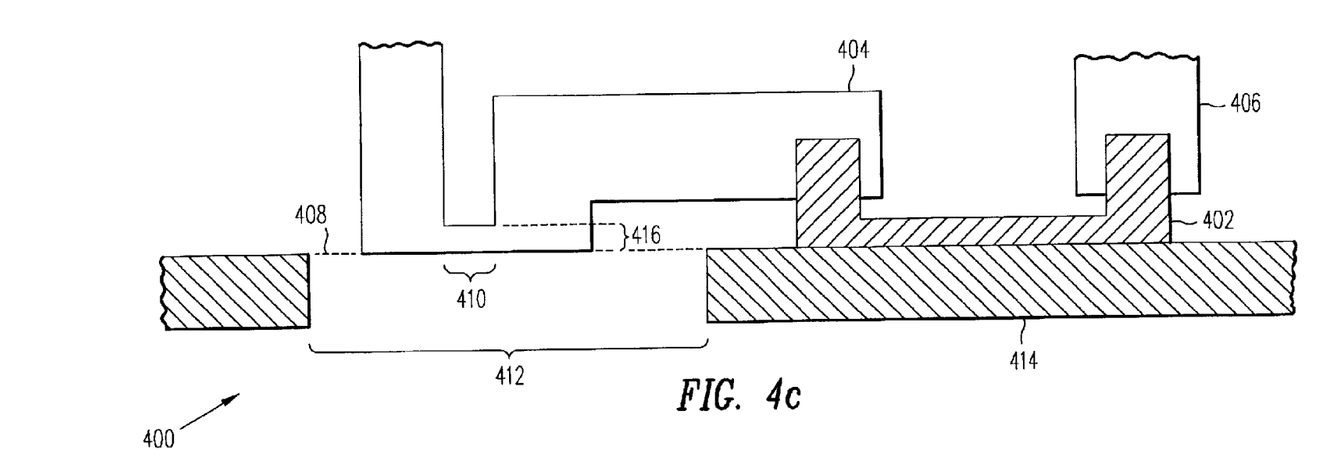
FIG. 4c illustrates an embodiment of the electrical lapping guide prepared for removal of an electrical lead.

At least one of the electrical leads 404 to the resistive thin film element 402 has a shallow portion 410 to facilitate removal. It is desirable to remove the electrical connection to the resistive thin film member 402 in order to avoid electrical interference during the subsequent use of the read or write element. The preferred method of removing the shallow portion 410 of the electrical lead 404 is to form a window 412 in the mask 414 which is used to construct the air bearing. FIG. 4c illustrates an example of utilizing a window in the air bearing mask to expose the shallow portion 410 of the electrical lead 404 during ion milling or reactive ion etching. Ion milling may be used to mill away the shallow portion 410 of the electrical lead 404 and can be achieved with the ion milling used to create the air bearing thus conserving the number of process steps. Alternatively reactive ion etching using an effective gas mixture may be used to etch away the shallow portion 410 of the electrical lead 404. Electrical leads formed from tantalum, tungsten, and titanium are readily removed with many reactive ion etching gas mixtures. If an alloy of nickel and iron is used as the material in the electrical leads then a reactive ion etching using a gas mixture of $CO/NH_3$ is effective. Very selective differential etch rates are possible with reactive ion etching methods because the etch rate of the usual alumina-titanium carbide material used for sliders is very low. One alternate removal method is using a laser to ablate the shallow portion of the electrical lead. Another alternate removal method is to use high current to melt the shallow portion of the electrical lead. The magnitude of current necessary to melt the shallow portion of the electrical lead depends on the material and the thickness of the material. The magnitude of current may be as low as 10 mA and as high as a few tens of milliamps. The duration of the current need be only a few milliseconds. These latter two methods are effective but require additonal apparatus.

Again referring to FIGS. 4a, b, c, and d, when using ion etching to remove the shallow portion 410 of the electrical lead 404 the height 416 of the shallow portion 410 should generally be less than 4 µm and preferably less than 1 µm. When using reactive ion etching to remove the shallow portion 410 of the electrical lead 404, the height 416 of the shallow portion 410 should generally be less than 1 µm. Therefore in general, it is preferable that the height 416 of the shallow portion 410 of the electrical lead 404 (after lapping and before removal) is limited to approximately 1 µm or less. Electrical leads with a height significantly greater than one micrometer may not be completely removed during milling or etching.

Figure 4D:
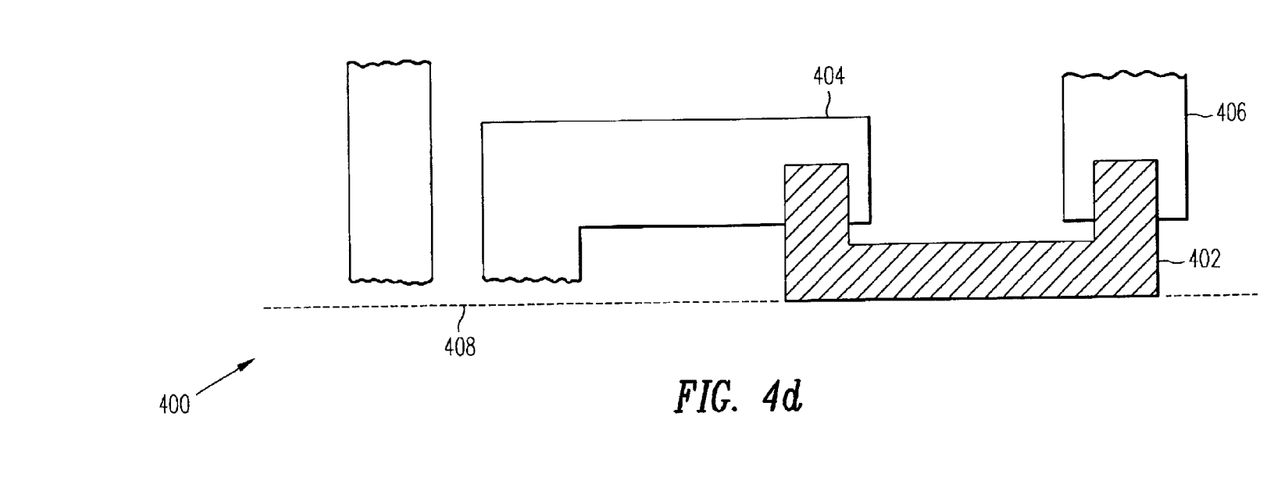
FIG. 4d illustrates an embodiment of the electrical lapping guide after removal of a portion of the electrical lead.

FIG. 4d illustrates the absence of the shallow portion of the electrical lead 404 after removal thereof.

Figure 5A:
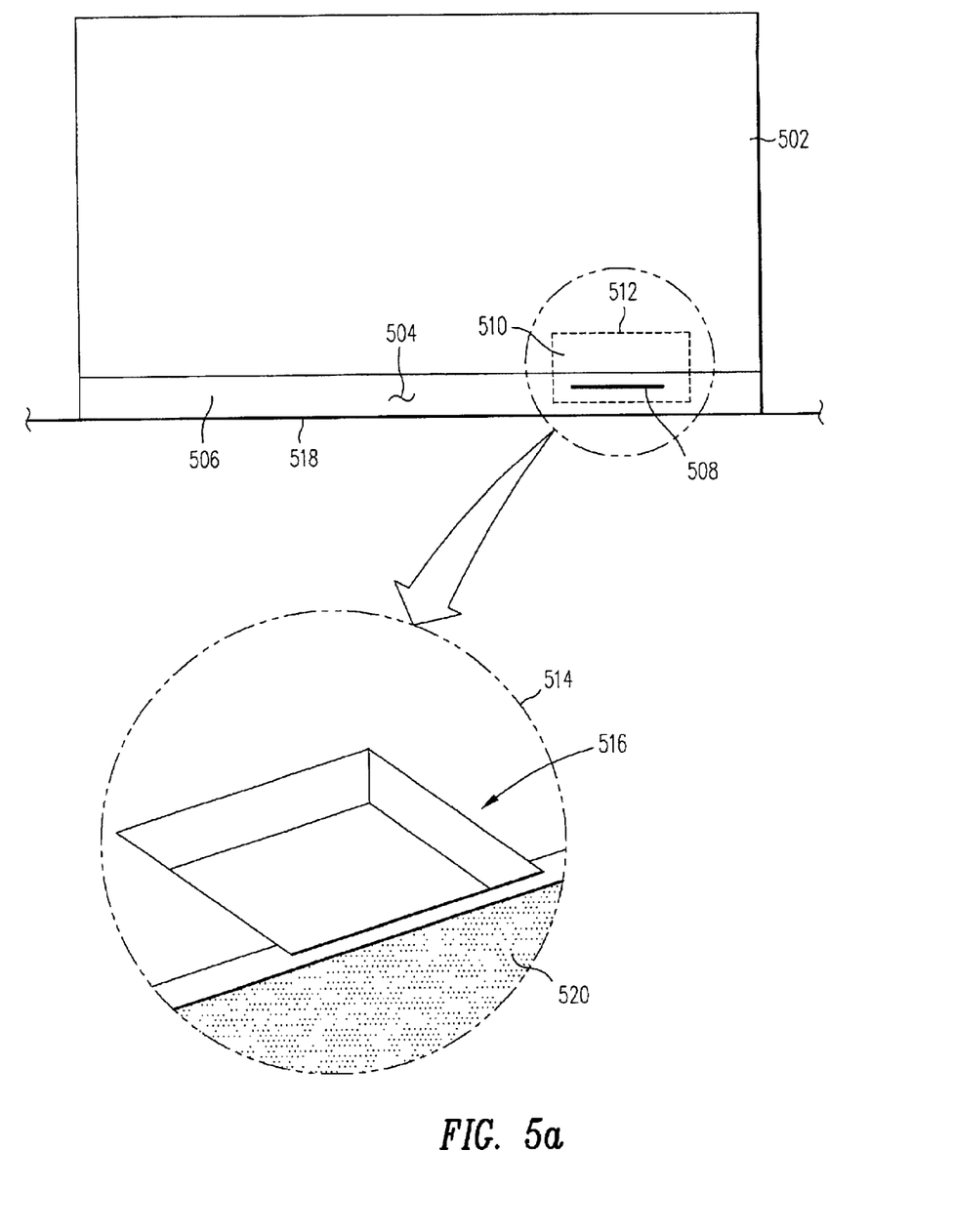
FIG. 5a illustrates an example of the location of the window in the air bearing mask.

FIG. 5a shows a detailed view of an example of a window in the air bearing mask used to expose the electrical lapping guide for removal. The trailing pad 502 (also illustrated with reference 214 in FIGS. 2a, c) of the air bearing is illustrated in FIG. 5a. The shielded read element 504 is usually sandwiched in a insulating material 506 on the trailing surface 520 of the slider. The electrical lapping guide 508 is preferable coplanar with the read element 504. When the mask for the air bearing is applied to the disk facing surface of the slider a small window 510, indicated by the area enclosed by the dashed line 512, is used to expose the electrical lapping guide 508. Preferably the area exposed by the window 510 in the mask is only a few micrometers in extent so that the pocket or void created when the shallow portion of the electrical lead is milled or etched has little or no effect on the performance of the air bearing. The expanded perspective view 514 in FIG. 5a illustrates the enclosed pocket 516 remaining in the trailing pad 502 after removal of the shallow portion of the electrical lead.

Figure 5B:
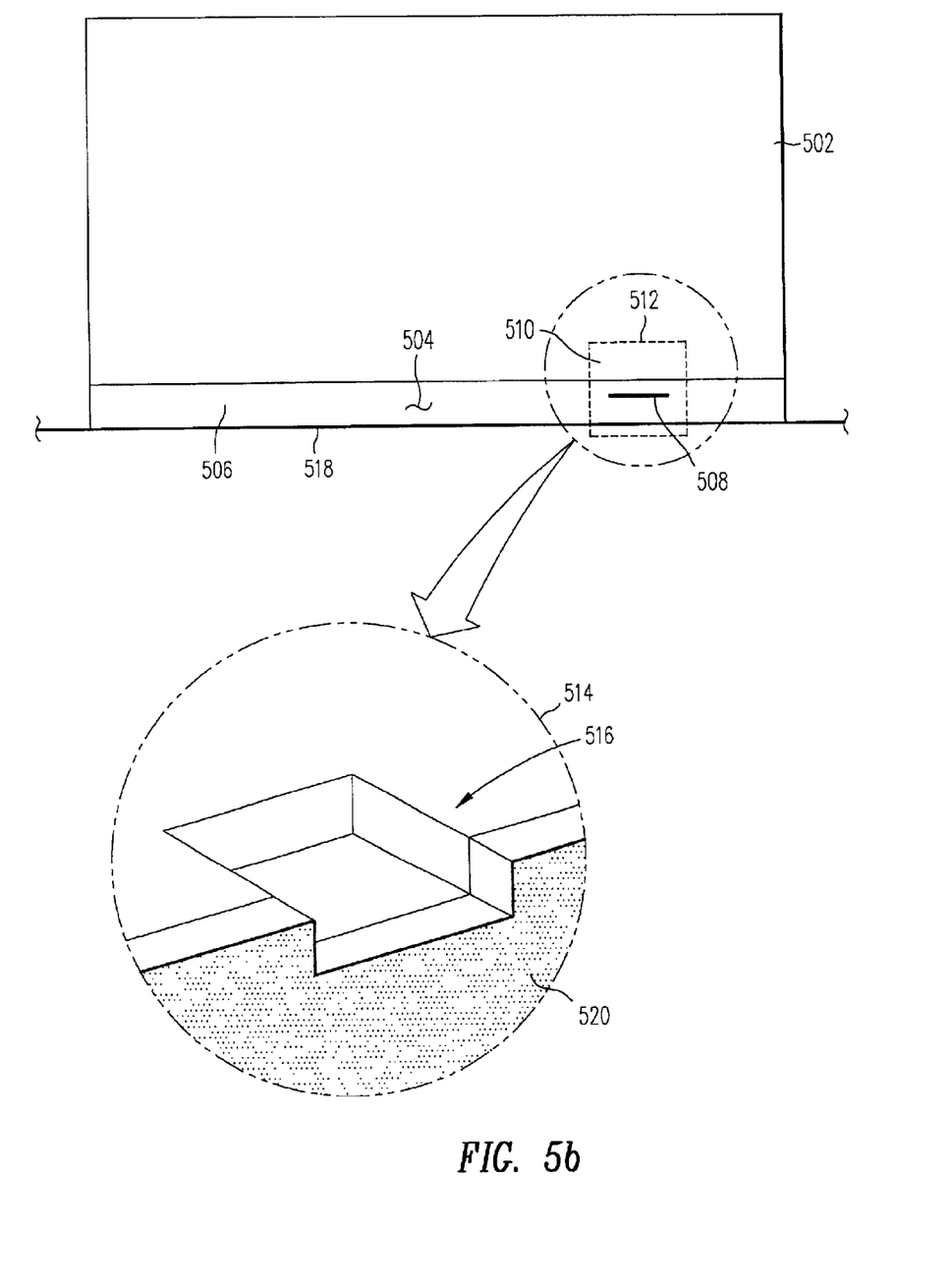
FIG. 5b illustrates an alternate example of the location of the window in the air bearing mask.

FIG. 5b illustrates an alternate placement of the window 510. In this embodiment, the window 510 in the mask extends beyond the trailing edge 518 of the trailing pad 502. The pocket 516 remaining in the trailing pad 502 after removal of the shallow portion of the electrical lead extends to the trailing surface 520 of the slider. The pocket 516 is not enclosed toward the trailing surface 520 and accordingly may have a slight effect on the performance of the air bearing.

Figure 6:
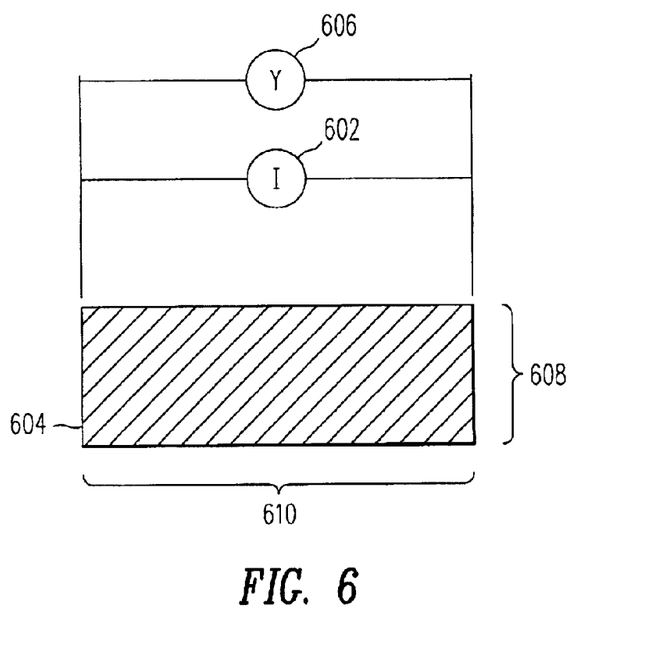
FIG. 6 illustrates the measurement of resistance of an electrical lapping guide; and, FIG. 7 illustrates a low diagram of the method of using an electrical lapping guide.

FIG. 6 illustrates a typical apparatus used to collect resistance information from the electrical lapping guide.

Typically a constant current 602 is passed through the resistive thin film member 604. The voltage 606 across the resistive thin film member is then measured. The relationship between the measured voltage 606 and the height 608 and width 610 of the resistive thin film member 604 is given by:

$$V=(I\rho W)/h,$$

Where I is the current, ρ is the sheet resistance of the resistive thin film member, W is the width of the resistive thin film member, and h is the height of the thin film member. Those skilled in the art will recognize that there is a small correction which can be made for the finite resistance of the electrical leads.

Figure 7:
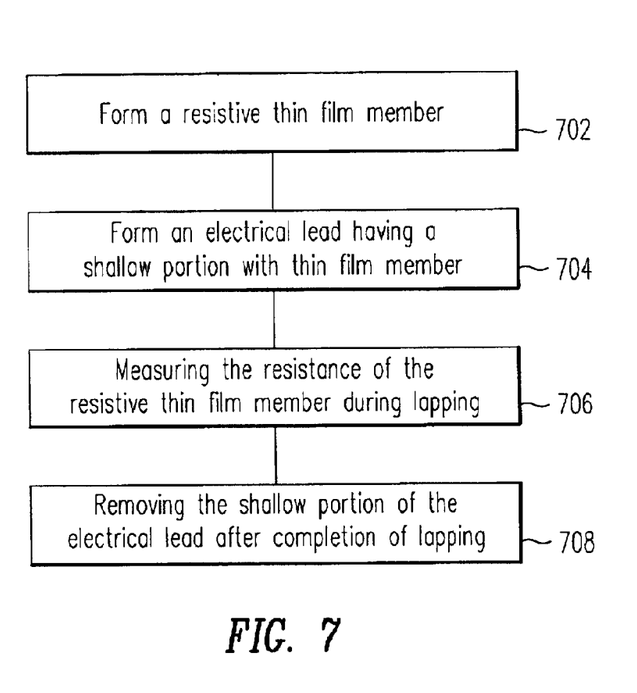

The method of using the present invention is summarized in FIG. 7. First a resistive thin film member (418 in FIG. 4a) is formed 702 on the trailing surface (302 in FIG. 3) of a slider (300 in FIG. 3). One electrical lead (320 in FIG. 3) is formed connecting the resistive thin film member (418 in FIG. 4a) with a read element connection pad (308 in FIG. 3). One electrical lead (322 in FIG. 3) is formed connecting the resistive thin film member (418 in FIG. 4a) with a write element connection pad (314 in FIG. 3). One of the electrical leads (404 in FIG. 4a) is formed 704 having a shallow portion (410 in FIG. 4b) to facilitate removal. During lapping the resistance of the electrical lapping guide (318 in FIG. 3) is measured 706. After lapping is complete, the shallow portion (410 in FIG. 4b) of the portion of the electrical lead (404 in FIG. 4a) is removed 708.

From the foregoing it will be apparent that the electrical lapping guide provided by the invention offers several advantages. For example, the electrical lapping guide is readily suitable for use on an individual slider; no additional connection pads are required; and, the connection to the electrical lapping guide may be removed after lapping to avoid interference with subsequent use of the read or write element. Although specific embodiments of the invention have been described and illustrated, the invention is not to be limited to the specific embodiments thus explicitly described. The invention is limited only by the claims.

We claim:

1. An electrical lapping guide formed on the trailing surface of a slider, the slider having an air bearing, comprising:

a resistive thin film member; and, an electrical lead connected with said resistive thin film member, said electrical lead having a portion thereof that is removable after lapping of the slider.

2. An electrical lapping guide as in claim 1 wherein said electrical lead is removable by ion milling during formation of the air bearing.

3. An electrical lapping guide as in claim 1 wherein said electrical lead is removable by reactive ion etching.

4. An electrical lapping guide as in claim 1 wherein said electrical lead is formed from tantalum.

5. An electrical lapping guide formed on the trailing surface of a slider, said slider having an air bearing surface, comprising:

a resistive thin film member; and, an electrical lead connected with said resistive thin film member, said electrical lead having a shallow portion, said shallow portion having a height of less than one micrometer.

6. An electrical lapping guide as in claim 5 wherein said electrical lead is removable by ion milling during formation of the air bearing.

7. An electrical lapping guide as in claim 5 wherein said electrical lead is removable by reactive ion etching.

8. An electrical lapping guide as in claim 5 wherein the electrical lead is formed from tantalum.

9. A method of using an electrical lapping guide, comprising:

forming a resistive thin film member;

forming an electrical lead connected with said resistive thin film member;

forming a shallow portion of the electrical lead, the shallow portion having a height less than about one micrometer after lapping;

measuring the resistance of the resistive thin film member during lapping;

removing the shallow portion of the electrical lead after lapping.

10. A method of using an electrical lapping guide as in claim 9 wherein the electrical connection is removed by ion milling.

11. A method of using an electrical lapping guide as in claim 9 wherein the electrical connection is removed by reactive ion etching.

12. A method of using an electrical lapping guide as in claim 9 wherein the electrical lead is formed from tantalum.

13. A method of using an electrical lapping guide as in claim 9 wherein lapping is halted when a predetermined value of resistance is reached.

14. An electrical lapping guide formed on the trailing surface of a single slider, said single slider having an air bearing surface, a read element with two read element connection pads, and a write element with two write element connection pads, comprising:

a resistive thin film member having a first end and a second end;

a first electrical lead connected with said first end of said resistive thin film member and one of the read element connection pads; and, a second electrical lead connected with said second end of said resistive thin film member and one of the write element connection pads.

15. An electrical lapping guide as in claim 14 wherein said electrical lead is removable by ion milling.

16. An electrical lapping guide as in claim 14 wherein said electrical lead is removable by reactive ion etching.

17. An electrical lapping guide as in claim 14 wherein said electrical lead is formed from tantalum.

* * * * *